Patented Feb. 20, 1940

2,191,029

UNITED STATES PATENT OFFICE 2,191,029

ANTHRAQUINONE COMPOUNDS AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application September 22, 1937, Serial No. 165,150

14 Claims. (Cl. 8—40)

This invention relates to anthraquinone compounds. More particularly it relates to amino substituted anthraquinone compounds which, depending on their structure, are suitable for the dyeing or coloration of organic derivatives of cellulose, wool, cotton, regenerated cellulose and silk. The invention includes the new anthraquinone compounds, the process for their preparation, the process of dyeing or coloring therewith and materials made of or containing an organic derivative of cellulose colored with said compounds.

Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

It is an object of our invention to provide a new class of anthraquinone compounds.

A further object of our invention is to provide a process for the dyeing or coloration of organic derivatives of cellulose.

A specific object is to provide a process for the dyeing or coloring of materials made of or containing an organic derivative of cellulose wherein the dye is applied directly from an aqueous suspension.

Another object is to provide material made of or containing an organic derivative of cellulose colored with the anthraquinone dye compounds of our invention.

A still further object is to provide a suitable process for the manufacture of the anthraquinone compounds of our invention.

The anthraquinone compounds, by means of which the above named objects are accomplished or made possible, are characterized in that they contain in an alpha position a radical selected from the group consisting of

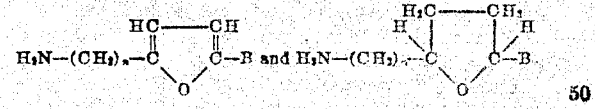

wherein B represents hydrogen, $-(CH_2)_xOH$ or $-(CH_2)_xNH_2$, wherein $x$ represents a whole number above zero, and $n$ is a whole number above zero. Advantageously, $n$ and $x$ are small whole positive numbers not greater than 4. Again, advantageously B is a hydrogen atom.

While our invention relates to anthraquinone compounds characterized in the manner just described, we have found that anthraquinone compounds having the general formula:

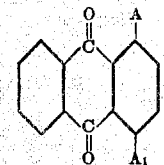

wherein A represents a radical selected from the group consisting of

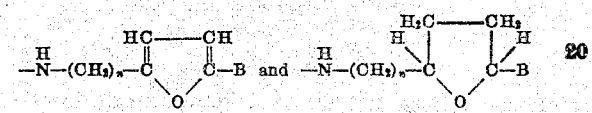

wherein B represents hydrogen, $-(CH_2)_xOH$ or $-(CH_2)_xNH_2$, wherein $x$ represents a whole number above zero, and $n$ is a whole number above zero and wherein $A_1$ may be the same as A and in addition may be a member selected from the group consisting of a hydroxy group, an amino group, an alkylamino group, a hydroxyalkylamino group, an arylamino group, an alkarylamino, a hydroarylamino group, a heterocyclic amino group and a nitrogen alkanesulfonic acid group joined to the anthraquinone nucleus through the nitrogen atom and in which the sulfonic acid group is separated from the nitrogen atom by a straight chain hydrocarbon radical of at least two carbon atoms are generally advantageous.

In order that our invention may be fully understood, the preparation of the anthraquinone compounds of the invention is described herein. Generally speaking, we have found that the compounds of our invention may be prepared in a satisfactory and advantageous way by condensing a leuco anthraquinone with an amine selected from the group consisting of

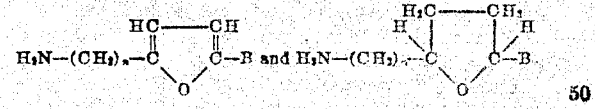

wherein B and n have the meaning previously assigned to them. These amines, for the sake of simplicity, will be referred to herein as "furan amines" as may properly be done. Leuco anthraquinones suitable for use are those containing an alpha negative substituent capable of being replaced by an amino group by the action of an amine. Negative substituents capable of such replacement include, for example, the hydroxy group, the nitro group, a halogen atom, such as chlorine or bromine, and an alkoxy group, such as methoxy or ethoxy. One or more negative substituents may be present. These will be replaced in whole or in part depending on the conditions under which the condensation reaction is conducted.

Examples of leuco anthraquinone compounds that may be employed are leuco quinizarin, leuco 1-hydroxy-4-aminoanthraquinone, leuco 1-methoxy-4-amino-anthraquinone, leuco 1-methoxy-4-amino-anthraquinone, leuco 1-chloro (or bromo) anthraquinone and leuco 1-hydroxy-4-chloroanthraquinone. 1-hydroxy-4-nitroanthraquinone and 1-nitro anthraquinone, for example, may likewise be condensed with a "furan amine" to form compounds included within the scope of our invention.

Examples of furan amines employed in the process of our invention include

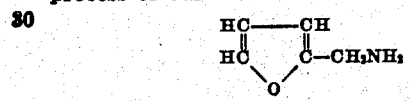

furfurylamine

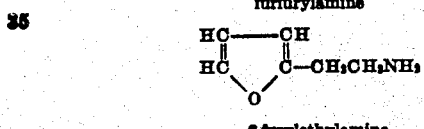

β-furylethylamine and

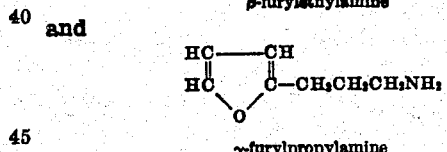

γ-furylpropylamine

Hydrogenated derivatives of the above compounds such as

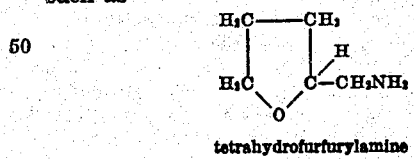

tetrahydrofurfurylamine and

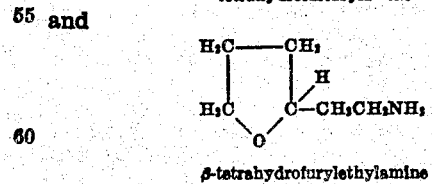

β-tetrahydrofurylethylamine for example, likewise may be employed in the process of our invention.

For convenience, the preparation of certain of the above mentioned furan amine compounds is given hereinafter. Tetrahydrofurfurylamine may be prepared as described by Winans and Adkins, Journal American Chemical Society, vol. 55, 2051 (1933). β-Furylethylamine and γ-Furylpropylamine may be prepared as described by Takamoto, J. Pharm. Soc. Japan, vol. 490, 1084 (1922) and vol. 48, 686 (1928), respectively.

The exact method employed for the preparation of the compounds of our invention is dependent on the compound to be prepared. Where the only substituent to be present is a furan amino group the anthraquinone compound may be prepared by condensing a leuco anthraquinone with a furan amine. More than one furan amino group may be present and in such case they may be the same or different. Where two different furan amino groups are to be present, the condensation may be carried out with both amines present or stepwise.

Where the desired anthraquinone compound is to contain both a furan amine radical and another substituent, an amine radical, for example, the condensation reaction may similarly be carried out with both amines present, or stepwise. Where this latter procedure is employed, the leuco anthraquinone may first be caused to react with one molecular equivalent weight of a furan amine and then with the desired amine or the leuco anthraquinone may first be caused to react with one molecular equivalent weight of an amine, other than a furan amine, and then with the desired furan amine.

Anthraquinone compounds containing substituents in addition to amino substituents may be obtained by treatment of the amino anthraquinone compound by known methods to cause the compound to be substituted with the substituent group desired to be added thereto and in some cases by proper selection of the anthraquinone starting material.

Amines, other than furan amines, which may be employed include, for example, methylamine, ethylamine, propylamine, butylamine, ethanolamine, propanolamine, butanolamine, aniline o-m-p-phenylene diamine, naphthylamine, o-m-p-toluidine, benzylamine, cyclohexylamine and cyclobutylamine.

The reactions above referred to may be carried out in water or in a solvent diluent medium such as ethanol, butanol, isobutyl alcohol or pyridine, for example. Where a leuco anthraquinone is employed as the starting material, the resulting leuco anthraquinone dye compound may be oxidized to the non-leuco form in any suitable manner. Where pyridine, for example, is the diluent medium employed, the oxidation may be carried out with air. The oxidation may likewise be carried out employing a perborate oxidizing agent, such as sodium perborate, for example. This latter oxidizing agent is of general utility and may be employed in the case of all the diluent mediums above mentioned.

The nuclear non-sulfonated compounds of our invention find particular application for the dyeing or coloration of organic derivatives of cellulose, especially cellulose acetate silk. The nuclear sulfonated compounds possess little or no application for the dyeing or coloration of organic derivatives of cellulose but may be employed as dyes for textile materials such as cotton, silk, regenerated cellulose and wool. In general, compounds which are sulfonated, but non-nuclearly, likewise find application as dyes for cotton, silk, regenerated cellulose and wool.

Where the anthraquinone nucleus is substituted with an aryl or hydroaromatic group, these groups may in turn be substituted with an amino group which may be treated with alkyl chlorohydrins such as ethylene, propylene, trimethylene or glycerol chlorohydrin to yield an aliphatic hydroxy substituted amino group.

The following examples illustrate the preparation of the compounds of our invention.

Example 1

24 grams of leuco quinizarin are dissolved in 250 cc. of pyridine along with 9.7 grams of furfurylamine and the mixture is refluxed for two hours. The leuco compound formed is oxidized with air following which the desired dye compound is obtained by concentrating the pyridine solution. It has the following probable formula:

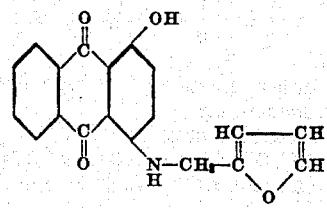

and dyes cellulose acetate silk a violet color from a water suspension.

Example 2

24 grams of leuco quinizarin are added to 500 cc. of ethyl alcohol together with 10.1 grams of tetrahydrofurfurylamine and the mixture is refluxed for four hours. The leuco compound formed is oxidized by adding sodium perborate to the boiling reaction mixture and the desired dye compound formed by this oxidation is recovered by concentrating the alcoholic mixture. The dye has the following probable formula:

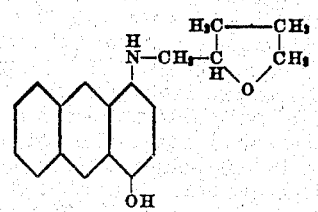

and dyes cellulose acetate silk a violet shade from a water suspension of the dye.

Example 3

24.9 grams of leuco 1-hydroxy-4-amino anthraquinone are dissolved in 300 cc. of pyridine, 10.1 grams of tetrahydrofurfurylamine are added slowly and the resulting mixture is refluxed for three hours. The leuco compound is oxidized with air and the dye compound formed by the oxidation treatment is recovered by concentrating the pyridine solution. It has the following probable formula:

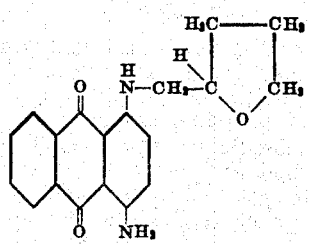

and dyes cellulose acetate silk a purple color from a water suspension.

Example 4

24 grams of leuco 1,4-diamino anthraquinone are dissolved in 250 cc. of pyridine, 21.3 grams (10% excess) of furfurylamine are added and the resulting mixture is refluxed for three hours. The leuco dye compound formed is oxidized with air and the dye compound formed by the oxidation treatment is recovered by concentrating the pyridine solution. The dye compound of the example has the following probable formula:

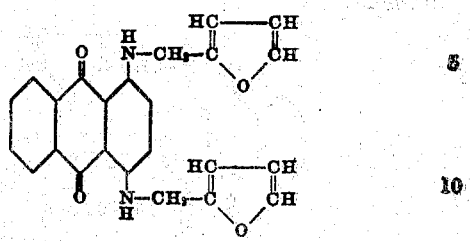

and dyes cellulose acetate silk a blue color from its water suspension.

Example 5

24 grams of leuco quinizarin are placed in 500 cc. of ethyl alcohol together with 22.2 grams (a 10% excess over that theoretically required) of tetrahydrofurfurylamine and the resulting mixture is refluxed for three hours. The leuco dye compound formed is oxidized with air to give the desired dye compound which is recovered by concentrating the alcoholic solution. The dye compound has the following probable formula:

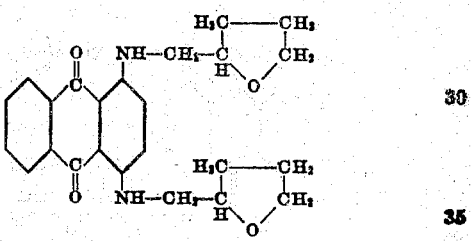

and dyes cellulose acetate silk a blue color from a water suspension.

Example 6

23.9 grams of leuco 1-hydroxy-4-aminoanthraquinone are added to 500 cc. of alcohol together with 9.7 grams of furfurylamine and heated at a refluxing temperature until the reaction is complete. The leuco dye compound is poured into water and oxidized with sodium perborate, filtered, washed with water and dried. The dye compound has the following probable formula:

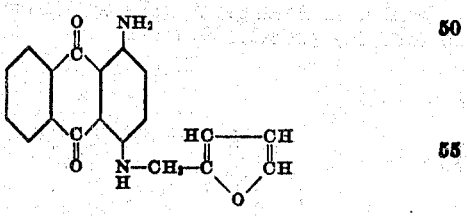

and colors cellulose acetate purple shades from an aqueous suspension of the dye. This same compound can be prepared in the manner described above by substituting leuco 1-methoxy-4-aminoanthraquinone for the leuco 1-hydroxy-4-aminoanthraquinone of the example.

Example 7

24 grams of leuco quinizarin are dissolved in 250 cc. of pyridine together with 6.2 grams of ethanolamine and the resulting mixture is refluxed for three hours. 9.7 grams of furfurylamine are then added and refluxing is continued for an additional three hours. The leuco dye compound formed is then oxidized with air and the desired dye compound formed thereby is recovered by concentrating the pyridine solution.

The dye compound has the following probable formula:

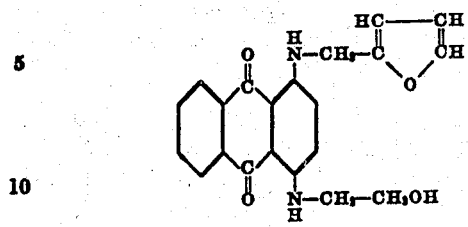

and dyes cellulose acetate blue shades from a water suspension of the dye.

Example 8

24 grams of leuco quinizarin are dissolved in 250 cc. of pyridine together with 13.6 grams (10% excess) of sodium taurinate and 11.1 grams (10% excess) of tetrahydrofurfurylamine. The resulting solution is then refluxed for four hours and the leuco dye compound formed is oxidized with air. The desired dye compound may be recovered by concentrating the pyridine solution. It has the following probable formula:

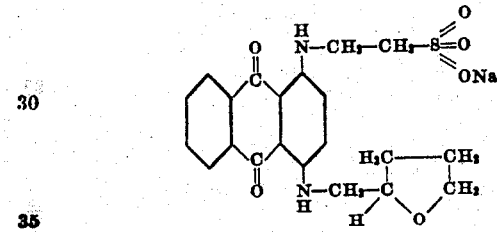

and dyes cellulose acetate silk a blue color from a water solution of the dye which may contain sodium chloride.

Example 9

24 grams of leuco quinizarin are added to 400 cc. of ethyl alcohol together with 11.1 grams of tetrahydrofurfurylamine and the mixture resulting is refluxed for three hours. 3.5 grams of methylamine are then added and refluxing is continued for an additional three hours. The leuco dye compound formed is worked up as described in Example 6. The dye formed has the following probable formula:

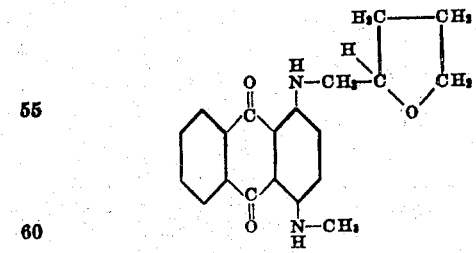

and dyes cellulose acetate blue from a water suspension.

Example 10

24.9 grams of leuco quinizarin are dissolved in 300 cc. of pyridine together with 9.7 grams of furfurylamine and 7.5 grams of

$H_2NCH_2CH_2CH_2OH$ and the mixture resulting is refluxed for 6 hours. The leuco dye compound formed is oxidized with air, for example, and the desired dye compound thereby formed is recovered by concentrating the pyridine solution. The dye has the following probable formula:

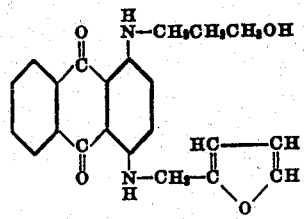

and dyes cellulose acetate silk a blue shade from an aqueous suspension.

$H_2NCH_2CHOHCH_3$ may be substituted for the $H_2NCH_2CH_2CH_2OH$ of the above example to obtain a dye compound of the following formula:

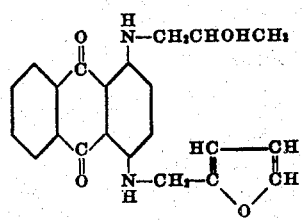

which colors cellulose acetate silk blue from an aqueous suspension.

Example 11

24 grams of leuco quinizarin are dissolved in 250 cc. of pyridine together with 11.9 grams of p-phenylenediamine and the resulting mixture is refluxed for three hours. 11.1 grams (10% excess) of tetrahydrofurfurylamine are then added and refluxing is continued for an additional 6 hours. The leuco dye formed is oxidized with air (or in any suitable manner) and the dye compound resulting is recovered by concentrating the pyridine mixture. The dye formed has the following probable formula:

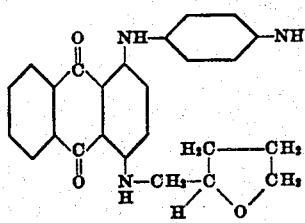

and dyes cellulose acetate silk blue-green shades from a water suspension.

Example 12

10 grams of the dye obtained in Example 11 are refluxed with 15 grams of ethylene chlorohydrin and 5 grams of dry sodium acetate for one or two hours. Part of the chlorohydrin may be recovered by distillation and the dye compound formed by the reaction may be precipitated by pouring into water and recovered by filtration. It has the following probable formula:

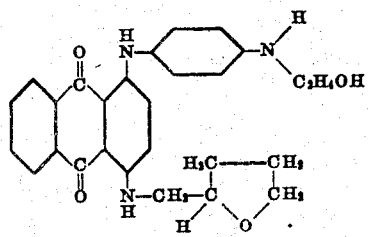

and dyes cellulose acetate silk bluish-green shades from an aqueous suspension.

Furfurylamine can be substituted for tetrahydrofurfurylamine of Example 11 and the dye compound formed can be treated as in Example 12 to obtain the corresponding furfurylamine derivative which likewise dyes cellulose acetate silk bluish-green shades from an aqueous suspension.

Example 13

24 grams of leuco quinizarin, 3.1 grams of methylamine and 400 cc. of ethyl alcohol are charged into an autoclave and heated at 90–100° C. for three hours with stirring. 10.7 grams (10% excess) of furfurylamine are then added and the heating is continued. When the reaction is complete, the autoclave is opened and the leuco dye compound formed is oxidized by passing air into the hot reaction mixture. The dye compound resulting may be recovered by concentrating the alcoholic mixture. This dye compound has the following probable formula:

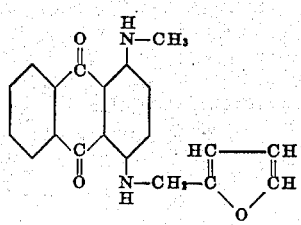

and dyes cellulose acetate blue shades from a water suspension.

Example 14

24 grams of leuco quinizarin and 11 grams of benzylamine are refluxed in 300 cc. of pyridine for three hours. 11.1 grams (10% excess) of tetrahydrofurfurylamine are then added and the refluxing is continued for four hours. The leuco dye compound formed is oxidized by treatment with air to form the desired dye compound which may be recovered by concentration of the pyridine solution. The final product of the reaction has the following probable formula:

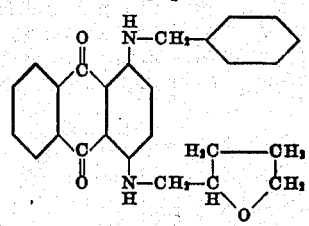

and dyes cellulose acetate blue shades from an aqueous suspension.

While our invention has been illustrated with reference to various furfurylamino anthraquinone and tetrahydrofurfurylamino anthraquinone compounds, it will be clearly understood that furan amine compounds other than furfurylamine and tetrahydrofurfurylamine may be employed. β-Furylethylamine or γ-furylpropylamine, for example, may be substituted for the particular furan amine employed in each of the examples to obtain furan amino anthraquinone compounds corresponding to those obtained in the examples.

Further compounds which may be prepared in accordance with the process of our invention and included within the scope of our invention include: 1-furfurylamino-4-benzylamino anthraquinone, 1-furfurylamino-4-cyclohexylamino anthraquinone, 1-tetra-hydrofurfurylamino-4-cyclohexylamino anthraquinone, 1-furfurylamino-4-tetrahydrofurfurylamino anthraquinone, 1-furfurylamino-4-cyclobutylamino anthraquinone, 1-tetrahydrofurfurylamino anthraquinone, 1-furfurylamino-4-ethylamino anthraquinone, 1-furfurylamino-4-hydroxyethylamino anthraquinone, 1-furfurylamino-4-p-phenylene diamino anthraquinone, and 1-furfurylamino-4-o-tolyl amino anthraquinone.

In order that the application of the compounds of our invention may be clearly understood, their application for the direct dyeing or coloration of materials made of or containing an organic derivative of cellulose, and more particularly cellulose acetate silk, is described hereinafter. Although the remarks are more particularly directed to the dyeing or coloring of the above mentioned materials, those pertaining to temperature, the dispersing agents and the amounts of dispersing agent and dye which may be employed, for example, are of general applicability where the dye is to be applied directly to the fiber from an aqueous suspension. The general methods by which the dye compounds may be applied to the coloration of other materials are well known in the art and need not be described here.

In employing the anthraquinone compounds of our invention as dyes, they will ordinarily be applied to the material in the form of an aqueous suspension which can be prepared by grinding the dye to a paste in the presence of a sulfonated oil, soap or other suitable dispersing agent and dispersing the resulting paste in water. Dyeing operations can, with advantage, be conducted at a temperature of 80–85° C., but any suitable temperature may be used. In accordance with the usual dyeing practice, the material to be dyed will ordinarily be added to the aqueous dye bath at a temperature lower than that at which the main portion of the dyeing is to be effected, a temperature approximating 45–55° C., for example, following which the temperature of the dyebath will be raised to that selected for carrying out the dyeing operation. The temperature at which the dyeing is conducted will vary somewhat, depending, for example, on the particular material or materials undergoing coloration.

The amount of dispersing agent employed may be varied over wide limits. Amounts approximating 10 to 200% by weight on the dye may be employed, for example. These amounts are not to be taken as limits as greater or lesser amounts can be used. To illustrate, if the dye is ground to a sufficiently fine powder, dyeing can be satisfactorily carried out without the aid of a dispersing agent. Generally speaking, however, the use of a dispersing agent is desirable.

It will be understood that the anthraquinone compounds of our invention may be applied to the material to be colored in any suitable manner. Coloration may be effected, for example, by dyeing, printing, or stenciling. Dispersing or solubilizing agents that can be employed for preparing suspensions of the dye include soap, sulphoricinoleic acid, salts of sulphoricinoleic acid, a water soluble salt of cellulose phthalate, cellulose succinate or cellulose mono-acetate diphthalate, for example, the sodium, potassium or ammonium salts, and sulfonated oleic, stearic or palmitic acid, or salts thereof, such, for example, as the sodium or ammonium salts.

The following examples illustrate how dyeing may be carried out in accordance with our invention. Quantities are expressed in parts by weight.

Example A 2 parts of

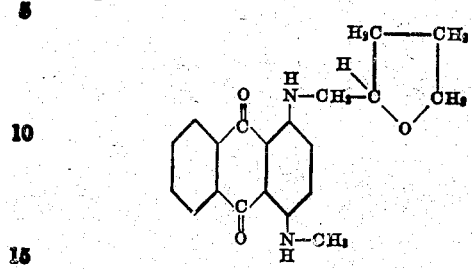

are finely ground with a dispersing agent such as soap or oleyl glyceryl sulfate and the resulting paste is dispersed in 1000 parts of water. The dispersion thus prepared is heated to a temperature approximating 45-55° C. and 100 parts of cellulose acetate silk, in the form of yarn or fabric, for example, are added to the dyebath after which the temperature is gradually raised to 80-85° C. and the silk worked for several hours at this latter temperature. Sodium chloride may be added as desired during the dyeing operation to promote exhaustion of the dyebath. Upon completion of the dyeing operation, the cellulose acetate silk is removed, washed with soap, rinsed and dried. The cellulose acetate silk is colored a blue shade of good fastness to light.

Example B 2 parts of

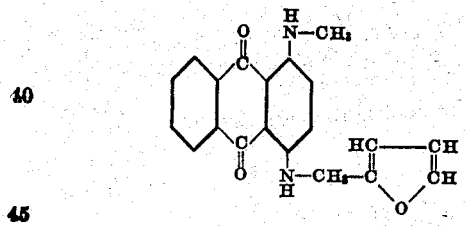

are finely ground with a dispersing agent such as soap or oleyl glyceryl sulfate and the resulting paste is dispersed in 1000 parts of water. The dispersion thus prepared is heated to a temperature approximating 45-55° C. and 100 parts of cellulose acetate silk, in the form of yarn or fabric, for example, are added to the dyebath after which the temperature is gradually raised to 80-85° C. and the silk worked for several hours at this latter temperature. Sodium chloride may be added as desired during the dyeing operation to promote exhaustion of the dyebath. Upon completion of the dyeing operation, the cellulose acetate silk is removed, washed with soap, rinsed and dried. The cellulose acetate silk is colored a blue shade of good fastness to light.

While our invention has been illustrated in connection with the dyeing of cellulose acetate silk, it will be understood that dyeing operations can be carried out in a manner similar to that described above by the substitution of another organic derivative of cellulose material for cellulose acetate silk or by employing dye compounds other than those employed in the examples, or by substitution of both the material being dyed and the dye compounds of the examples.

We claim:

1. As new products anthraquinone compounds characterized in that they contain in an alpha position the radical:

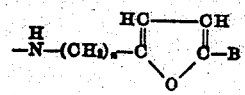

wherein B represents a member selected from the group consisting of hydrogen, —(CH$_2$)$_x$OH and —(CH$_2$)$_x$NH$_2$, wherein $x$ is 1, 2, 3 or 4 and $n$ is 1, 2, 3 or 4.

2. As new products anthraquinone compounds characterized in that they contain in an alpha position the radical:

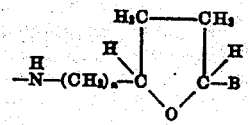

wherein B represents a member selected from the group consisting of hydrogen, —(CH$_2$)$_x$OH and —(CH$_2$)$_x$NH$_2$, wherein $x$ is 1, 2, 3 or 4 and $n$ is 1, 2, 3 or 4.

3. As new products anthraquinone compounds having the general formulae:

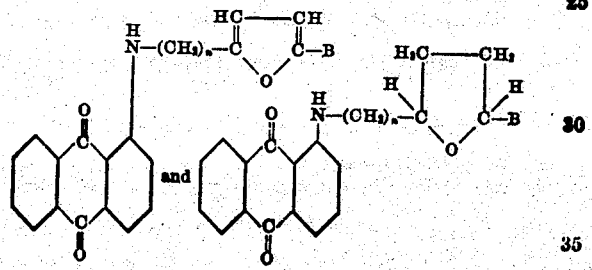

wherein B represents a member selected from the group consisting of hydrogen, —(CH$_2$)$_x$OH and —(CH$_2$)$_x$NH$_2$, wherein $x$ is 1, 2, 3 or 4 and $n$ is 1, 2, 3 or 4.

4. As new products anthraquinone compounds characterized in that they contain in an alpha position the furfurylamine radical.

5. As new products anthraquinone compounds characterized in that they contain in an alpha position the tetrahydrofurfurylamine radical.

6. The anthraquinone compound having the formula:

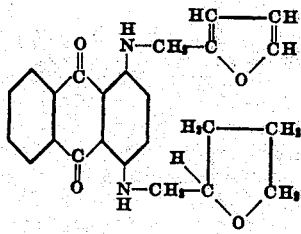

7. The process of coloring material made of or containing an organic derivative of cellulose which comprises applying thereto a nuclear non-sulfonated anthraquinone dye compound selected from the group of anthraquinone compounds characterized in that they contain in an alpha position a radical selected from the group consisting of:

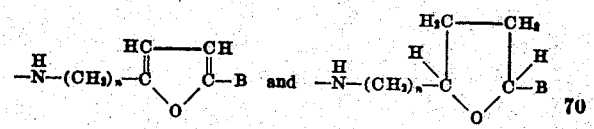

wherein B represents a member selected from the group consisting of hydrogen, —(CH$_2$)$_x$OH and —(CH$_2$)$_x$NH$_2$, wherein $x$ is 1, 2, 3 or 4 and $n$ is 1, 2, 3 or 4.

8. The process of coloring a material made of or containing an organic derivative of cellulose which comprises applying thereto a nuclear non-sulfonated anthraquinone dye compound selected from the group of anthraquinone compounds characterized in that they contain in an alpha position a member selected from the group consisting of the furfurylamine radical and the tetrahydrofurfurylamine radical.

9. The process of coloring a material made of or containing an organic acid ester of cellulose which comprises applying thereto a nuclear non-sulfonated anthraquinone dye compound selected from the group of anthraquinone compounds characterized in that they contain in an alpha position a radical selected from the group consisting of:

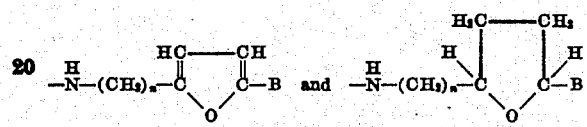

wherein B represents a member selected from the group consisting of hydrogen, —(CH₂)ₓOH and —(CH₂)ₓNH₂, wherein $x$ is 1, 2, 3 or 4 and $n$ is 1, 2, 3 or 4.

10. The process of coloring a cellulose acetate which comprises applying thereto a nuclear non-sulfonated anthraquinone dye compound selected from the group of anthraquinone compounds characterized in that they contain in an alpha position a radical selected from the group consisting of:

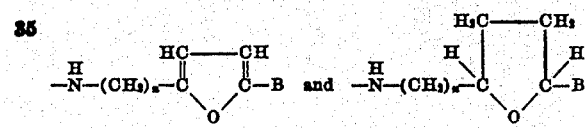

wherein B represents a member selected from the group consisting of hydrogen, —(CH₂)ₓOH and —(CH₂)ₓNH₂, wherein $x$ is 1, 2, 3 or 4 and $n$ is 1, 2, 3 or 4.

11. The process of coloring a cellulose acetate which comprises applying thereto a nuclear non-sulfonated anthraquinone dye compound selected from the group of anthraquinone compounds characterized in that they contain in an alpha position a member selected from the group consisting of the furfurylamine radical and the tetrahydrofurfurylamine radical.

12. The process of preparing anthraquinone compounds which comprises condensing an anthraquinone compound containing an alpha negative substituent capable of being replaced by an amino group by the action of an amine with an amine selected from the group consisting of

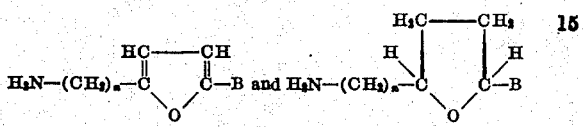

wherein B represents a member selected from the group consisting of hydrogen, —(CH₂)ₓOH and —(CH₂)ₓNH₂, wherein $x$ is 1, 2, 3 or 4 and $n$ is 1, 2, 3 or 4.

13. As new products, anthraquinone compounds characterized in that they contain in an alpha position a radical selected from the group consisting of:

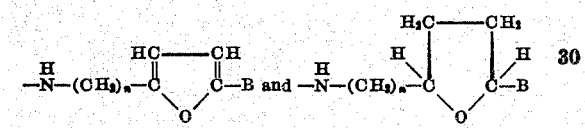

wherein B represents a member selected from the group consisting of hydrogen, —(CH₂)ₓOH and —(CH₂)ₓNH₂, wherein $x$ is 1, 2, 3 or 4 and $n$ is 1, 2, 3 or 4.

14. As a new product, 1-furfurylamino-4-ethylamino anthraquinone.

JAMES G. McNALLY.
JOSEPH B. DICKEY.